(12) United States Patent
Zhao et al.

(10) Patent No.: US 7,575,614 B2
(45) Date of Patent: Aug. 18, 2009

(54) STARTUP BURNER

(75) Inventors: Jian Lian Zhao, Belmont, MA (US); William F. Northrop, Ann Arbor, MI (US); Timothy Bosco, Dallas, TX (US); Vincent Rizzo, Norfolk, MA (US); Changsik Kim, Lexington, MA (US)

(73) Assignee: Nuvera Fuel Cells, Inc., Billerica, MA (US)

( * ) Notice: Subject to any disclaimer, the term of this patent is extended or adjusted under 35 U.S.C. 154(b) by 429 days.

(21) Appl. No.: 11/132,157

(22) Filed: May 17, 2005

(65) Prior Publication Data

US 2005/0257427 A1  Nov. 24, 2005

Related U.S. Application Data

(60) Provisional application No. 60/571,910, filed on May 17, 2004.

(51) Int. Cl.
| | |
|---|---|
| *C01B 3/00* | (2006.01) |
| *C01B 3/02* | (2006.01) |
| *C01B 3/32* | (2006.01) |
| *C01B 3/36* | (2006.01) |
| *C01B 3/38* | (2006.01) |
| *C10J 1/00* | (2006.01) |
| *C10J 1/02* | (2006.01) |

(52) U.S. Cl. ............... 48/198.7; 48/197 R; 48/198.1; 48/198.6; 48/199 R; 48/199 FM

(58) Field of Classification Search ............. 48/197 R, 48/198.1, 198.6, 198.7, 199 R, 197 FM, 199 FM
See application file for complete search history.

(56) References Cited

U.S. PATENT DOCUMENTS

| | | | |
|---|---|---|---|
| 4,642,272 A | 2/1987 | Sederquist | |
| 4,659,634 A | 4/1987 | Struthers | |
| 4,678,723 A | 7/1987 | Wertheim | |
| 4,861,347 A * | 8/1989 | Szydlowski et al. | ........... 48/61 |
| 5,047,299 A * | 9/1991 | Shockling | ........... 429/20 |
| 5,595,833 A * | 1/1997 | Gardner et al. | ........... 429/19 |
| 5,725,366 A * | 3/1998 | Khinkis et al. | ........... 431/10 |
| 6,077,620 A | 6/2000 | Pettit | ........... 429/26 |
| 6,472,092 B1 * | 10/2002 | Matsuda et al. | ........... 429/17 |
| 6,838,062 B2 | 1/2005 | Goebel et al. | ........... 422/198 |
| 6,846,585 B2 | 1/2005 | Robb et al. | ........... 429/20 |
| 7,285,247 B2 * | 10/2007 | Smaling et al. | ........... 422/105 |
| 2002/0141917 A1 * | 10/2002 | Komaki et al. | ........... 422/196 |
| 2002/0155331 A1 * | 10/2002 | Kamegaya et al. | ........... 429/19 |
| 2003/0000145 A1 * | 1/2003 | Salemi et al. | ........... 48/199 FM |
| 2003/0154654 A1 * | 8/2003 | Goebel | ........... 48/198.3 |

(Continued)

OTHER PUBLICATIONS

Pischinger et al., "Start-Up Behavior of Fuel Processors for PEM Fuel Cell Applications," SAE International, SAE Technical Papers, Document No. 2003-01-0420, Book No. SP-1741, SAE 2003 World Congress & Exhibition, Mar. 2003, Detroit, MI.

*Primary Examiner*—Walter D Griffin
*Assistant Examiner*—Huy-Tram Nguyen
(74) *Attorney, Agent, or Firm*—Finnegan, Henderson, Farabow, Garrett & Dunner LLP

(57) ABSTRACT

A startup burner for rapidly heating a catalyst in a reformer, as well as related methods and modules, is disclosed.

14 Claims, 5 Drawing Sheets

U.S. PATENT DOCUMENTS

| | | | |
|---|---|---|---|
| 2003/0196381 A1* | 10/2003 | Eberspach | 48/197 FM |
| 2003/0233789 A1* | 12/2003 | Dauer et al. | 48/197 R |
| 2004/0043343 A1* | 3/2004 | Kamijo | 431/2 |
| 2004/0144030 A1* | 7/2004 | Smaling | 48/211 |
| 2005/0072140 A1* | 4/2005 | Taylor et al. | 60/295 |
| 2005/0086865 A1* | 4/2005 | Crane et al. | 48/198.7 |
| 2005/0087436 A1* | 4/2005 | Smaling et al. | 204/172 |
| 2005/0188615 A1* | 9/2005 | Sennoun et al. | 48/127.9 |
| 2006/0037308 A1* | 2/2006 | Kamijo et al. | 60/286 |

* cited by examiner ental Application Ser. No. 60/571,910, filed May
STARTUP BURNER

CROSS REFERENCE TO RELATED APPLICATION

Under 35 U.S.C. § 119, this application claims priority to U.S. Provisional Application Ser. No. 60/571,910, filed May 17, 2004, the contents of which are incorporated herein by reference.

STATEMENT REGARDING FEDERALLY SPONSORED RESEARCH

This invention was made with Government support under Contract No. DE-FC02-99EE50580 awarded by the U.S. Department of Energy. The Government has certain rights in this invention.

TECHNICAL FIELD

The present invention relates to startup burners, as well as related methods and modules.

BACKGROUND

It is possible, with contemporary compact designs, to make fuel reformers with sufficient energy density to be suitable for automotive use. However, compactness does not necessarily provide rapid startup. One of the limiting factors in starting up a cold reformer is heating the catalyst contained therein to a desired light off temperature.

SUMMARY

The present invention relates to a startup burner for use in connection with a reformer. Generally speaking, the burner includes a burner chamber, fuel and air inlets, an igniter, and at least a first and second mixing zone. The burner produces a hot gas emission suitable for heating a catalyst (e.g., a catalyst used in an autothermal reforming (ATR)) to a desired temperature (e.g., the light-off temperature of the catalyst). Preferably the catalyst achieves the desired temperature in about three minutes or less, or more generally in about one-quarter or less of the time required to heat the catalyst without the burner.

In one aspect, the present invention features a method that includes the following four steps: (1) mixing a first oxygenated flow (e.g., air) and a fuel to create a rich fuel/air mixture; (2) igniting the rich fuel/air mixture to produce a partially oxidized mixture; (3) reacting the partially oxidized mixture with a second oxygenated flow (e.g., air) to produce a final gas; and (4) heating a reforming catalyst by flowing the final gas through the catalyst. The first and second oxygenated flows can be from the same source.

In some embodiments, the heating step can include heating the catalyst to a desired temperature (e.g., a light-off temperature) in at most about 3 minutes (e.g., at most 2 minutes or at most about 1 minute). The desired temperature can be at most 400° C. (e.g., at most about 350° C., at most about 300° C., or at most about 250° C.). After heating the catalyst to the desired temperature, the supply of the first oxygenated flow can be terminated and then water either as a liquid or as a gas can be mixed with the fuel to create a humidified fluid. The humidified fluid can be subsequently mixed with the second oxygenated flow to form a reactant mixture for use in a reforming reaction. Water can also be mixed with the fuel after heating the catalyst to the desired temperature, but before terminating the supply of the first oxygenated fluid.

In another aspect, the present invention features a startup burner for heating a catalyst in a reformer. The startup burner includes a burner chamber; a first mixing zone in fluid communication with and upstream of the burner chamber, in which a first oxygenated flow and a fuel flow are mixed within the first mixing zone to form a mixture; an igniter proximate to the first mixing zone for igniting the mixture to produce a partially oxidized mixture within the burner chamber; and a second mixing zone in fluid communication with and downstream of the burner chamber, wherein the partially oxidized mixture further reacts with a second oxygenated flow to produce a final gas, which is directed to flow through the catalyst. The first and second oxygenated flows and the fuel flow can respectively have a heat exchange relationship with an exhaust stream from an auxiliary burner. The startup burner can be removably detachable to the reformer (i.e., can be readily connected with the reformer and removed from the reformer). The startup burner can be constructed and operated such that the final gas passing through the catalyst bed is produced by a clean lean combustion.

In still another aspect, the present invention features a module that includes a reformer (e.g., an autothermal reformer) containing a catalyst and a startup burner in fluid communication with and upstream of the reformer. The startup burner is adapted to burn a fuel/air mixture to produce a first region of combustion in which the combustion is rich, followed by a second region of combustion in which the product of the first region of combustion further reacts with air to produce a lean exhaust; which is directed to flow through the catalyst to heat the catalyst to a desired temperature. The module can further contains an auxiliary burner adapted to burn either or both of a fuel and a fuel cell anode exhaust to produce heat for warming fluids in the module.

These and other aspects of the invention will be more readily understood by those skilled in the art from the following detailed description of a preferred invention and the appended drawing figures.

DESCRIPTION OF DRAWINGS

The present invention may be more readily understood with frequent reference being made to the appended drawings where.

DETAILED DESCRIPTION

While the present invention is susceptible of embodiment in many different forms, this disclosure will describe in detail at least one preferred embodiment, and possible alternative embodiments, with the understanding that the present disclosure is to be considered merely as an exemplification of the principles and is not intended to limit the broad aspect of the invention to the specific embodiments illustrated.

In general, fuel reformers of the ATR-type, or related reformer types such as a partial oxidation reformers, generate the heat required for the endothermic steam reforming reaction by oxidizing part of the fuel to be reformed in the reforming catalyst bed, or in a special cavity at its entrance. The other major type of fuel reformer is a steam reformer, in which no oxygen and therefore no combustion occurs in the reforming catalyst bed, and all heat is supplied to the reaction across a wall encasing the bed, or by a similarly indirect route. While steam reforming has certain advantages over ATR, particularly in producing a reformate with a higher hydrogen concentration, heating a steam reformer through the walls of the catalyst chamber is inherently slow. An ATR reactor can be heated more rapidly to high temperatures by the ATR reaction itself, but first the ATR catalyst must be heated to its light-off temperature, at which it becomes catalytically effective so that the reaction becomes highly exthotherrnic and catalyst temperature starts to rise rapidly. A startup burner can be used for this startup process, i.e., to accelerate the heating of the catalyst to its light-off temperature.

Figure 1:
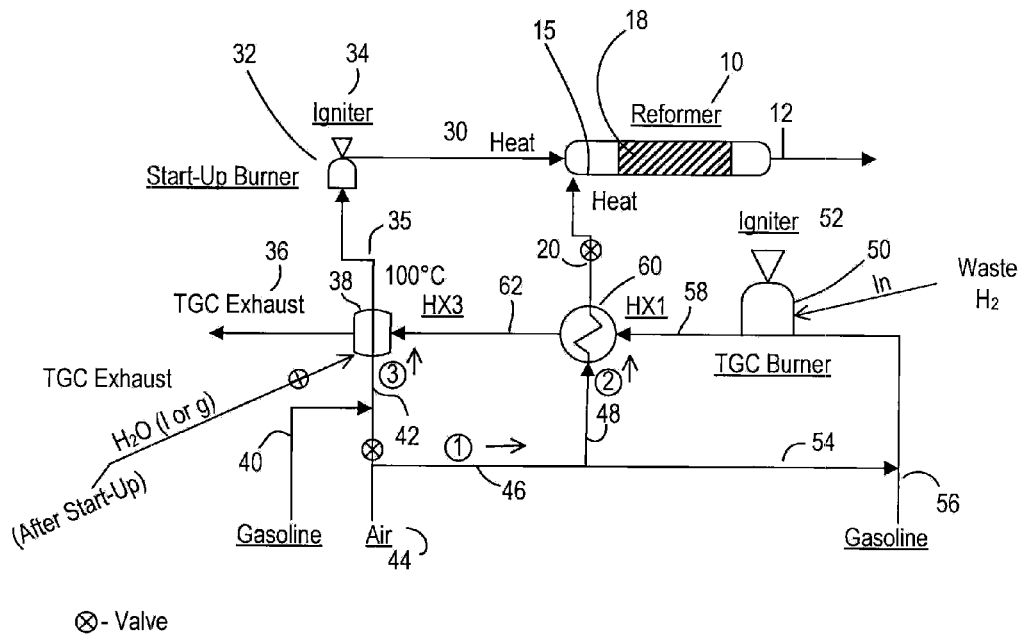
FIG. 1 is a schematic illustrating generally the flows of one embodiment of the reformer system.

FIG. 1 shows a preferred topology of the flows in the system during startup. At the upper right is an autothermal reformer 10 having an outlet to downstream systems 12, a catalyst section 18 and an inlet section 15 with a first inlet 20 of an oxygenated flow, preferably air ("ATR air"), and a second inlet 30 through which is admitted a second flow, which at startup comprises a mixture of an oxygenated gas, preferably air, and fuel passing through startup burner 32. The burner 32 typically includes an igniter 34. The fuel is gasoline in this example, but can be any hydrocarbon or alcohol suitable for use in a reformer to produce hydrogen for a fuel cell.

The fuel/air mixture for the startup burner is made from regulated sources of fuel and of air, the air line 42 branching from a general air supply 44. Fuel and air are mixed and are preheated in a first heat exchanger 38 ("HX3") by heat exchange with the exhaust 62 of an system auxiliary burner, or "tail gas combustor" (TGC) 50. The exhaust is generally emitted after this heat exchange step. The TGC 50, having igniter 52, is supplied at startup by regulated sources of air flow 54 and of fuel flow 56 which are often mixed before entering the TGC 50. Provisions may be made for pre-vaporization of the fuel flow 56 if required. Note that after startup, TGC 50 typically is not supplied with fuel, but is used for converting waste hydrogen from a fuel cell (e.g., a fuel cell anode exhaust) into heat, usually used for preheating various fluids in the system.

The TGC exhaust 58 enters a second heat exchanger 60 ("HXI") and leaves it via line 62, passing to the first heat exchanger 38 and then being exhausted from the system. "ATR air", i.e., air supplied to the autothermal reformer via the route through which air is added for the autothermal reforming reaction in normal use, is supplied via line 48 to second heat exchanger 60 and then via line 20 into the inlet section 15 of the reformer. The volume of air required in the startup operation will typically, although not necessarily, be significantly less than the amount needed in full operation.

The system typically has an inlet for water, steam, or a combination of the two which will substitute for air inlet 42 when the system is moved from start-up conditions to regular operation. The fuel 40 and the steam or water will preferably be mixed before entering the first heat exchanger 38, especially if the fuel is liquid and needs to be vaporized.

It may appear that having two burners (i.e., a TGC and a startup burner), as opposed to just one, in the system is inefficient. However, it can actually be an advantage. This is because a suitably designed system can have all components sized properly for efficiency in normal operation, while allowing conversion from a start-up procedure to a normal running procedure simply by changing an air feed to the startup burner during startup to a steam feed during normal operation. The execution of this arrangement, which is preferred, but not rigidly required, will be more evident after the layout of a preferred mechanical system is described.

Figure 2:
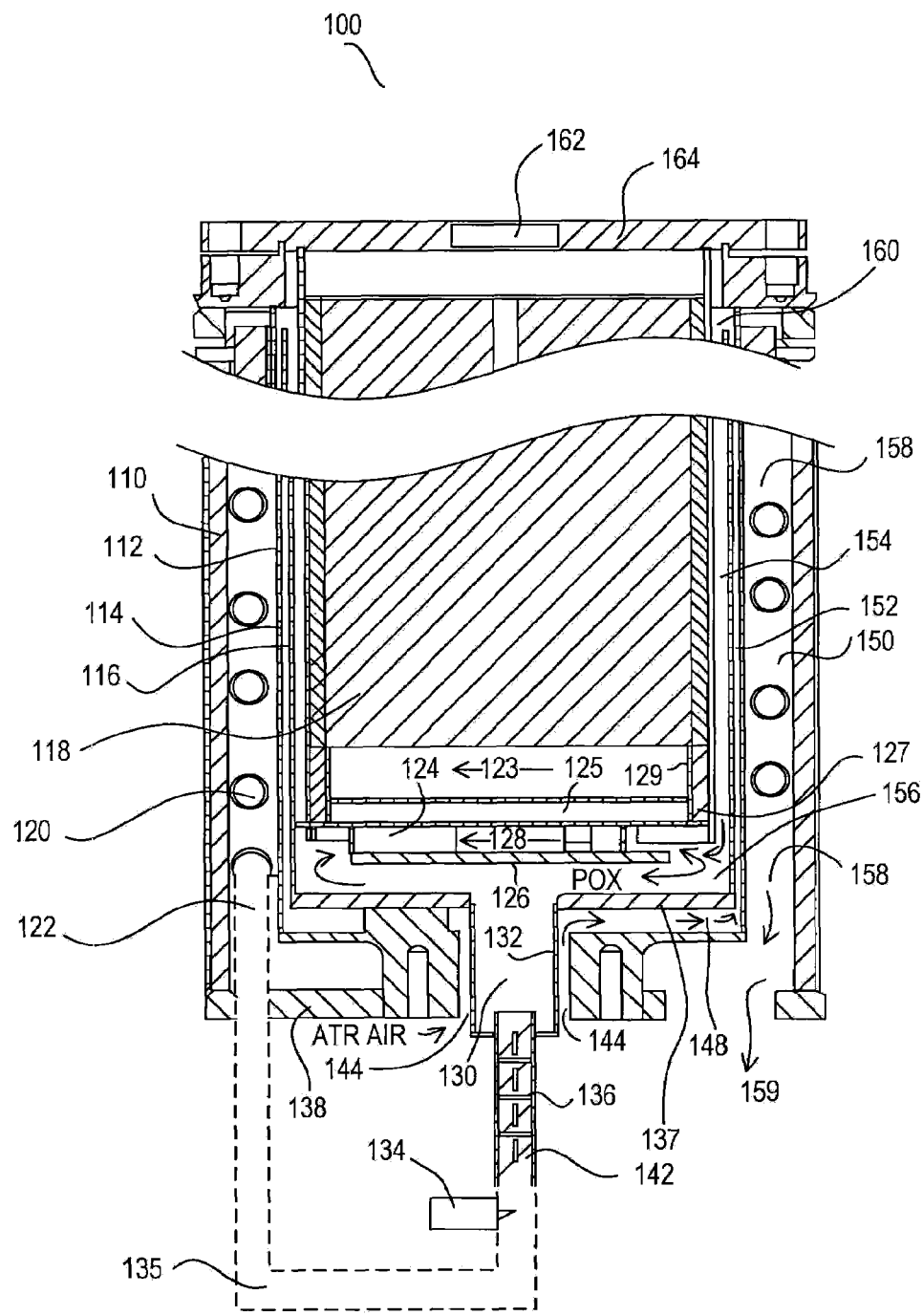
FIG. 2 is a cross section of a specific embodiment of the invention.

FIG. 2 shows a schematic drawing (relative part sizes, etc. not necessarily to scale) of a current embodiment of a system having the flow schematic of FIG. 1. The autothermal reformer, the startup burner and the heat exchangers are closely integrated into a module 100. The module 100 has a first annular wall 110, a second annular wall 112, a third annular wall 114, and a fourth annular wall 116 that surrounds the reformer catalyst 118. It is the catalyst 118 that needs to be warmed to a light-off temperature to allow for operation of the reformer. The quicker the achievement of the catalyst light-off temperature, the quicker the startup operation.

The four walls define three annular zones: first zone 150, second zone 152, and third zone 154. Each annular zone is a component of a heat exchanger, as explained below. In this embodiment, a spiral tube 120, having an inlet (not illustrated) and an outlet 122, runs through the first zone 150. In alternative embodiments, not illustrated, the spiral tube 120 could be replaced by an additional shell and annular zone, could be located in a different annular zone than the one illustrated, or could be located in a different device other than the one illustrated (e.g., an independent TGC).

At the bottom of FIG. 2, tube 142 is the entrance into the startup burner 130 for fuel and air during startup, and is connected by a linkage (shown here as dotted line 135), to outlet 122 of spiral tube 120. The tube 120 is the equivalent of the fuel/air side in the first heat exchanger 38 of FIG. 1, which equilibrates a fuel/air mixture with the burner exhaust. In FIG. 2, the TGC exhaust 158 flows in first annular zone 150, passing through the zone along spiral tube 120 and thereby exchanging heat with the fuel/air mixture in spiral tube 120. In this embodiment, the first heat exchanger consists largely of tube 120 and zone 150 (and its walls 110 and 112). The TGC exhaust 158 leaves the system after this exchange, for example at exit 159 while the heated fuel/air mixture is passed from exit 122 to burner entrance 142.

While entering tube 142, the fuel/air mixture is ignited by igniter 134. The fuel/air mixture is caused to swirl by mixer 136, or functionally equivalent means, and the swirling burning gas passes into burner cup 130 where it combusts. As previously noted, air is the preferred oxygen flow source. Where "air" is referenced, it is intended to represent any suitable oxygenated flow.

The fuel/air mixture is preferably rich, i.e., the fuel/air stoichiometry (phi) is preferably greater than 1, for example between about 1.6 and about 1.05 (e.g., about 1.2), because burning a rich (fuel excess) fuel/air mixture prevents excessive heating and NOx formation. The swirling action can be arranged to allow a stable flame to persist in cup 130, so that igniter 134 need not be used continuously, but only to start the flame. The top of cup 130 may be connected to a stabilizer plate 137, and may, as in the current embodiment, be further connected to annular shell 114.

The swirling partially oxidized fuel/air mixture then leaves burner cup 130, is diverted by diverter plate 126, and enters mixing zone 128. In this zone, the hot partially oxidized fuel mixes with excess air entering from third zone 154, which is the entrance route for air normally used for the ATR reaction.

In FIG. 1, the ATR air passes through line 48 into second heat exchanger 60, and then via line 20 into the autothermal reformer 10. In FIG. 2, a physical embodiment of FIG. 1, ATR air enters the module 100 at entrance 144 which annularly surrounds burner cup 130. The ATR air is typically from a source outside the system, and is typically controlled by a valve, not illustrated. The ATR air is preheated as it passes through passage 148, around the outside wall 132 of burner cup 130, and then enters the second zone 152, where it is further heated by the TGC exhaust 158 flowing in zone 150. At connection 160 (top of the reformer), second zone 152 connects to third zone 154, which exchanges heat with catalyst 118 via fourth wall 116. The ATR air leaves zone 154 at exit 156, and reacts in mixing zone 128 with the partially oxidized fuel exiting burner cup 130. Mixing zone 128 may have mixing vanes 124 or other aids to completely mix the ATR air and the partially oxidized fuel. The gas mixture, now having excess air (phi less than 1; "lean"), passes through porous diffuser plate 125 and into catalyst bed 118, optionally via a mixing space 123. In the presence of the extra air, conversion of the hydrocarbons in the partially oxidized fuel to carbon dioxide is completed at a relatively low temperature, thereby preventing NOx formation and damage to the catalyst.

The diluted gas then passes through and heats up the catalyst bed 118 (18 in FIG. 1). After heating the catalyst bed or monolith 118, the exhaust leaves the autothermal reformer zone through a fenestrated or open section 162 of reformer end plate 164.

In this embodiment, the various parts of the device for mixing the ATR air with the combusted fuel are parts of a single mixing assembly, comprising parts 124, 125, 126 and 128, which are held together by a shell 127, and optionally further carrying a ring 129 to create space 123 separating diffuser plate 125 from catalyst 118.

As noted, while the ATR air is passing through the second zone 152, the air is in heat exchange, across second wall 112, with TGC exhaust 158, which is running countercurrently in the first (outer) annular zone 150. This pair of annular zones, and wall 112, are the core of the second heat exchanger 60 of FIG. 1. It is clear from FIG. 2 that in the embodiment described, the interaction of the exhaust 158 with the two heat exchangers is simultaneous rather than the sequential interaction implied by FIG. 1.

When the catalyst has reached a certain temperature (e.g., the light-off temperature), the system can be shifted to normal operation very simply. The flow of air into the startup burner 32 (FIG. 1) from inlet 42 can be stopped, and steam, generated elsewhere in the system, can be mixed with the fuel coming from line 40 and the mixture flows into the first heat exchanger 38. The steam/fuel mixture can also be sent to the first heat exchanger 38 without terminating the flow of air from inlet 42. Turning to FIG. 2, it can be seen that the steam/air mixture for reforming then follows the path of the fuel/air mixture used in the startup process. It passes through helical tube 120 to exit 122, burner entrance 142, burner cup 130, the mixing zone 128 to be mixed with a regulated amount of heated ATR air from entrance 156, and into the hot catalyst 118, where autothermal reforming now occurs, absorbing heat from the concurrent oxidation of part of the reforming fuel with the ATR air. In this stage of operation, heat flowing outward from the catalyst 118 is absorbed by the ATR air flowing through annular zones 154 and 152, and thereby the escaping heat is returned to the reformer.

Turning to other components, the module 100 generally requires an igniter 134 and an electric source to allow the igniter 134 to spark to initiate the startup process. Elsewhere in the module 100, devices for turning on and off an air flow to mix with fuel going into the reformer must be added. Devices for regulating steam to be mixed with that fuel, and to regulate ATR air volume in proportion to the fuel flow, must also be present in a normal ATR reformer.

Figure 3:
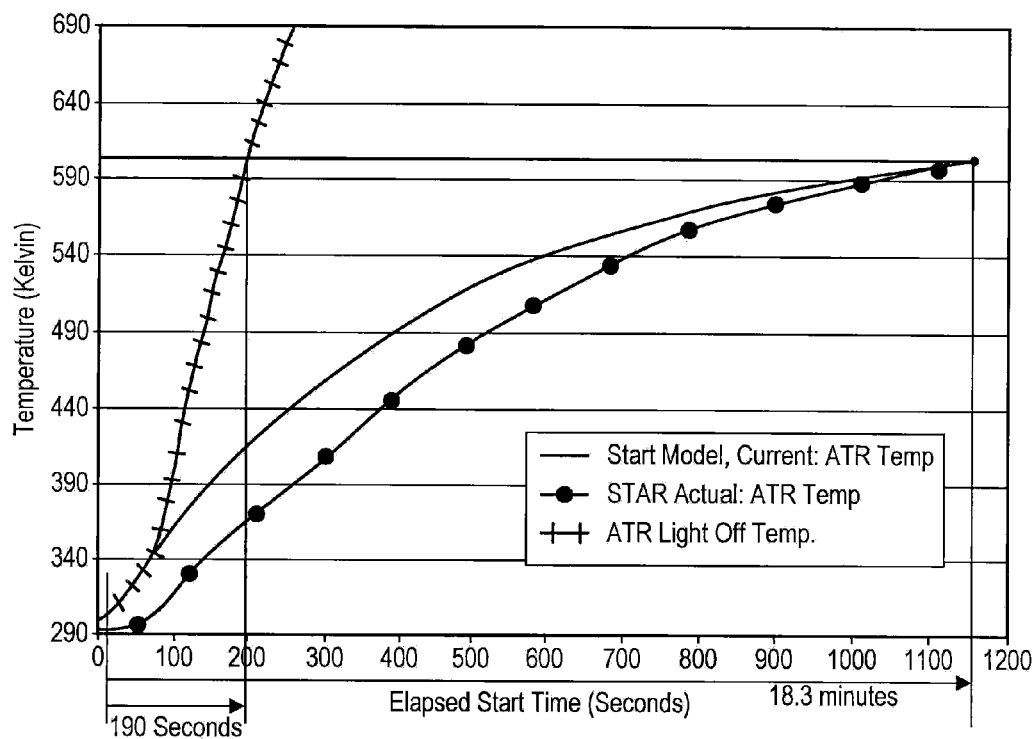
FIG. 3 is a graphical illustration of a calculated startup time reduction.
Figure 4:
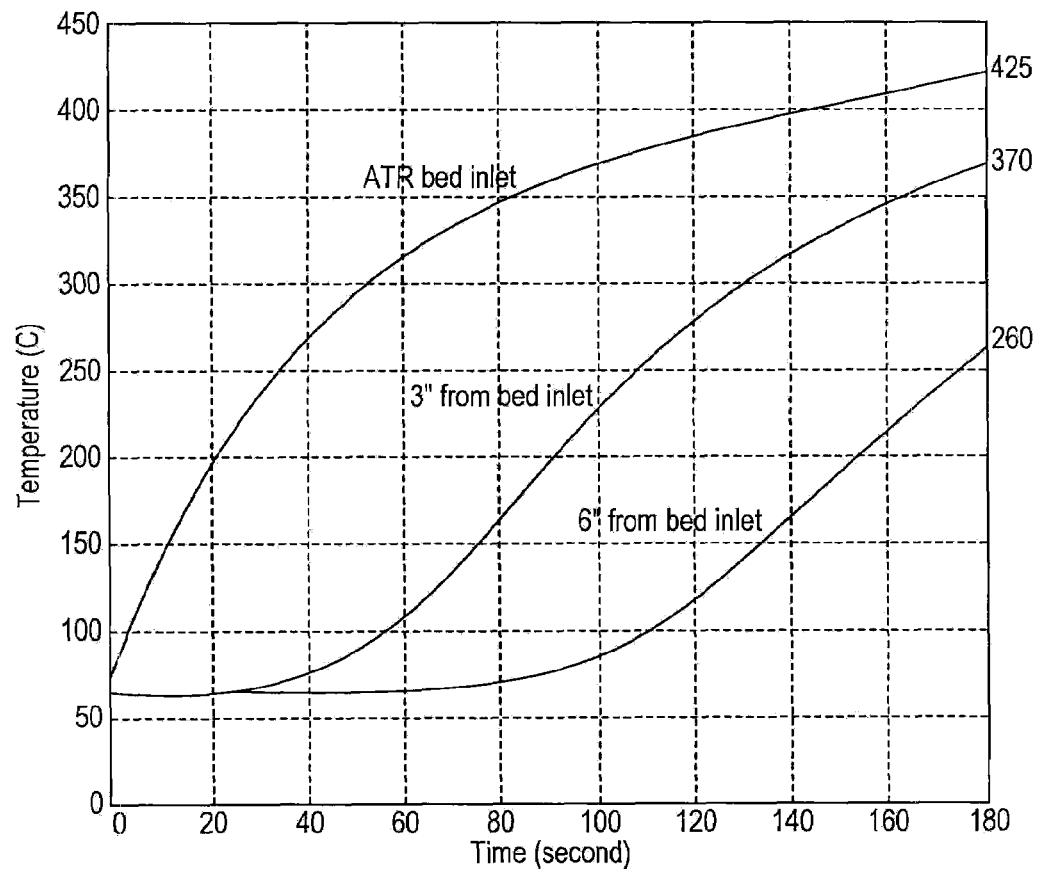
FIG. 4 is a graphical illustration of catalyst bed temperatures versus time for a modeled run.
Figure 5:
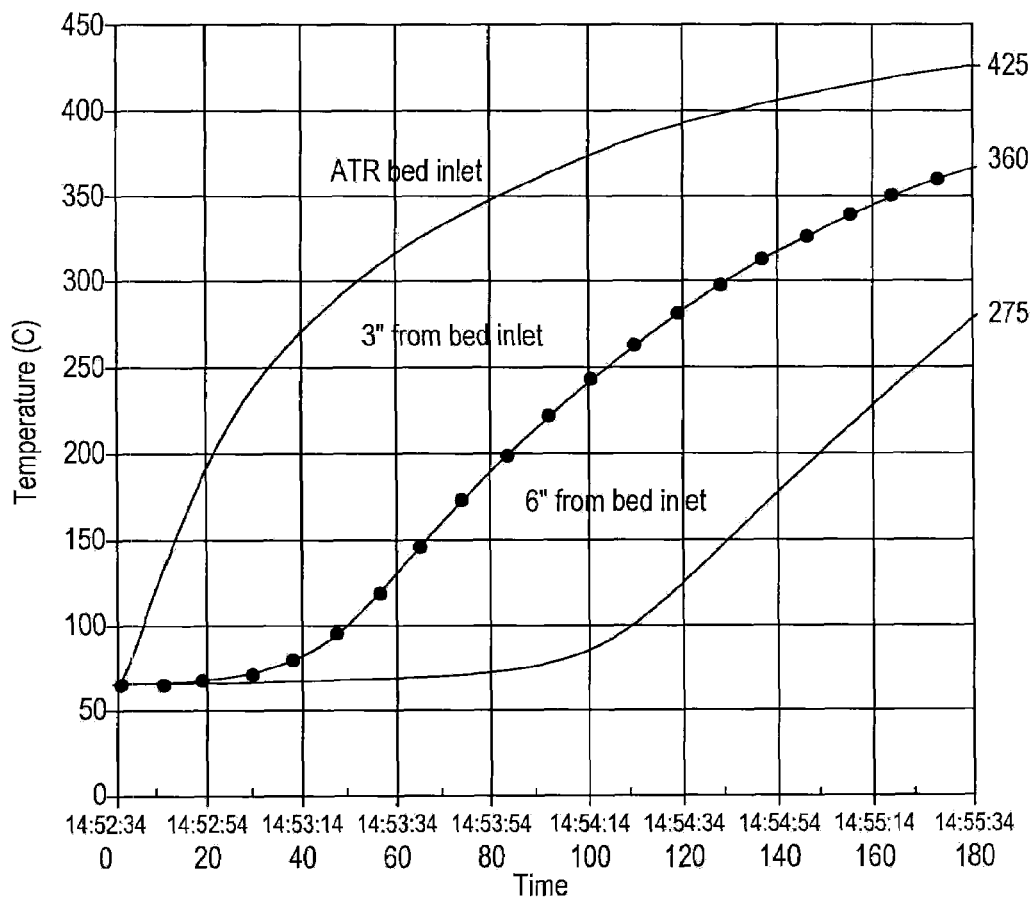
FIG. 5 is a graphical illustration of catalyst bed temperatures versus time in actual operation.

FIG. 3 shows the modeling results predicting the increased speed of catalyst warming obtainable from the module 100. The predicted startup time is decreased from 18 minutes to three minutes by use of the startup burner. FIG. 4 shows the modeling results predicting the temperature profile in the catalyst bed as a function of time. FIG. 5 shows actual temperature profile in the catalyst bed as a function of time, which validates the modeling results. The startup burner described above can significantly shorten startup time.

In one embodiment, an improved utility of a reformer equipped with a startup burner described above is its modularity and ease of assembly. For example, the mixing assembly (parts 124 through 129) can be made as one unit and then inserted into a single shell (shell 116) along with the catalyst 118. Likewise, the entire startup burner can be made as an assembly (elements 142, 134, 130, 136, 137) and connected either by bonding, or simply by fit, with shell 114. A heat exchange unit can comprise shells 10 and 112 with tube 120. A module can then be assembled by combination of a reformer with these three assemblies, with suitable spacing elements in between, plus options such as base block 138, which can serve to stabilize the burner cup 130 and its inlet tube 142.

Another important aspect of the inventive module equipped with a separate startup burner is its efficiency. Heat released by the startup burner is directly transferred to the adjacent catalyst, while the temperature of the exhaust of the startup burner is controlled by reacting the combustion exhaust of a rich fuel/air mixture with a second oxygenated flow. At each stage of operation, both in the startup phase and in the normal operation phase, thin concentric heat exchangers serve to focus heat where it is needed while minimizing heat loss from the system. In particular, the two annular zones 152 and 154 convey heat from the TGC exhaust to warm the catalyst 118 during startup, and then help retain heat in the catalyst during normal operation. Likewise, the mixing assembly works efficiently both in the startup stage and in the normal operation stage. The "ATR air" is typically preheated by the startup burner during startup and by the TGC and the autothermal reformer during normal operation. This switching of heat exchange patterns is accomplished without valving of any hot fluids, except for the opening of a steam inlet valve.

Once in possession of this description of the invention, a variety of functionally equivalent burner/reformer combinations can be envisaged by a skilled artisan. While the invention has been shown and described with reference to the preferred embodiments, it will be understood by those skilled in the art that various changes in form and detail may be made therein without departing from the spirit and scope of the invention as defined by the appended claims.

What is claimed is:

1. A method, comprising:
    mixing a first oxygenated flow and a fuel to create a rich fuel/air mixture;
    igniting the rich fuel/air mixture to produce a partially oxidized mixture;
    reacting the partially oxidized mixture with a second oxygenated flow to produce a final gas; and
    heating a reforming catalyst by flowing the final gas through the catalyst.

2. The method of claim 1, wherein the heating step includes heating the catalyst to at most about 400° C.

3. The method of claim 1, wherein the heating step includes heating the catalyst to at most about 350° C.

4. The method of claim 1, wherein the heating step includes heating the catalyst to at most about 300° C.

5. The method of claim 1, wherein the first oxygenated flow comprises air.

6. The method of claim 1, wherein the second oxygenated flow comprises air.

7. The method of claim 1, wherein the first oxygenated flow and the second oxygenated flow are from the same source.

8. The method of claim 1, wherein the heating step includes heating the catalyst to a desired temperature in at most about three minutes.

9. The method of claim 1, wherein the heating step includes heating the catalyst to a desired temperature in at most about two minutes.

10. The method of claim 1, wherein the heating step includes heating the catalyst to a desired temperature in at most about one minute.

11. The method of claim 1, further comprising mixing water either as a liquid or as a gas with the fuel to create a humidified fluid after heating the catalyst to a desired temperature.

12. The method of claim 1, further comprising terminating the supply of the first oxygenated flow after heating the catalyst to a desired temperature.

13. The method of claim 12, further comprising mixing water either as a liquid or as a gas with the fuel to create a humidified fluid after terminating the supply of the first oxygenated flow.

14. The method of claim 13, further comprising mixing the humidified fluid with the second oxygenated flow to form a reactant mixture for use in a reforming action.

* * * * *